Sept. 11, 1923.
G. A. CLEMENT ET AL
1,467,308
METHOD OF GRINDING ONE-PIECE BIFOCAL LENSES
Filed May 20, 1921   3 Sheets-Sheet 1
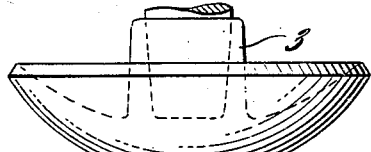
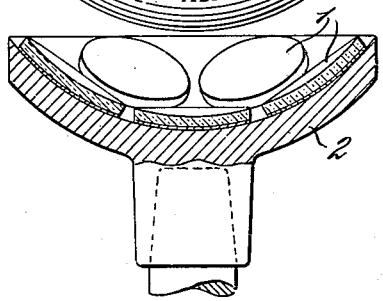
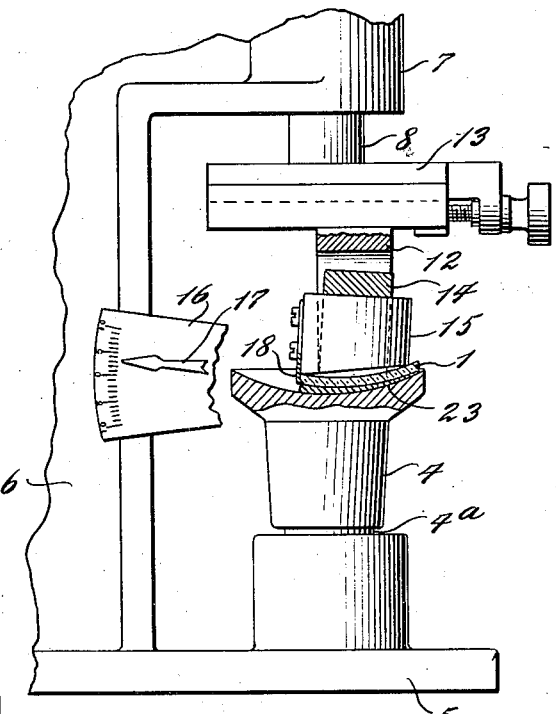
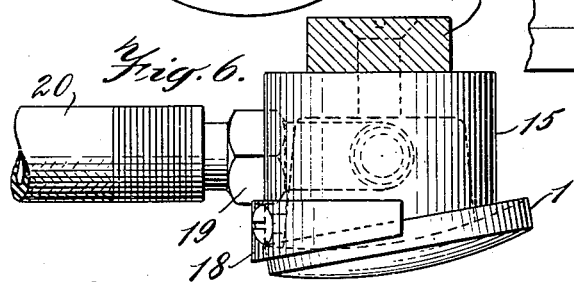
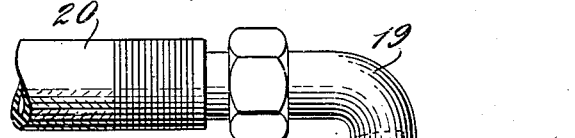
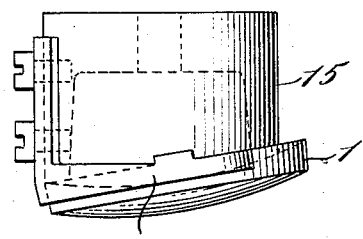
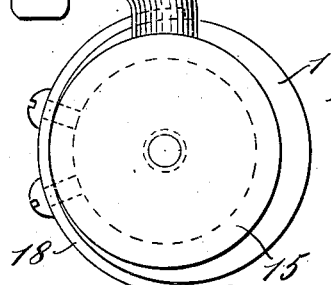
George A. Clement
Hans Clement
INVENTORS.
BY
Rosenbaum, Stockbridge & Borst
ATTORNEYS.

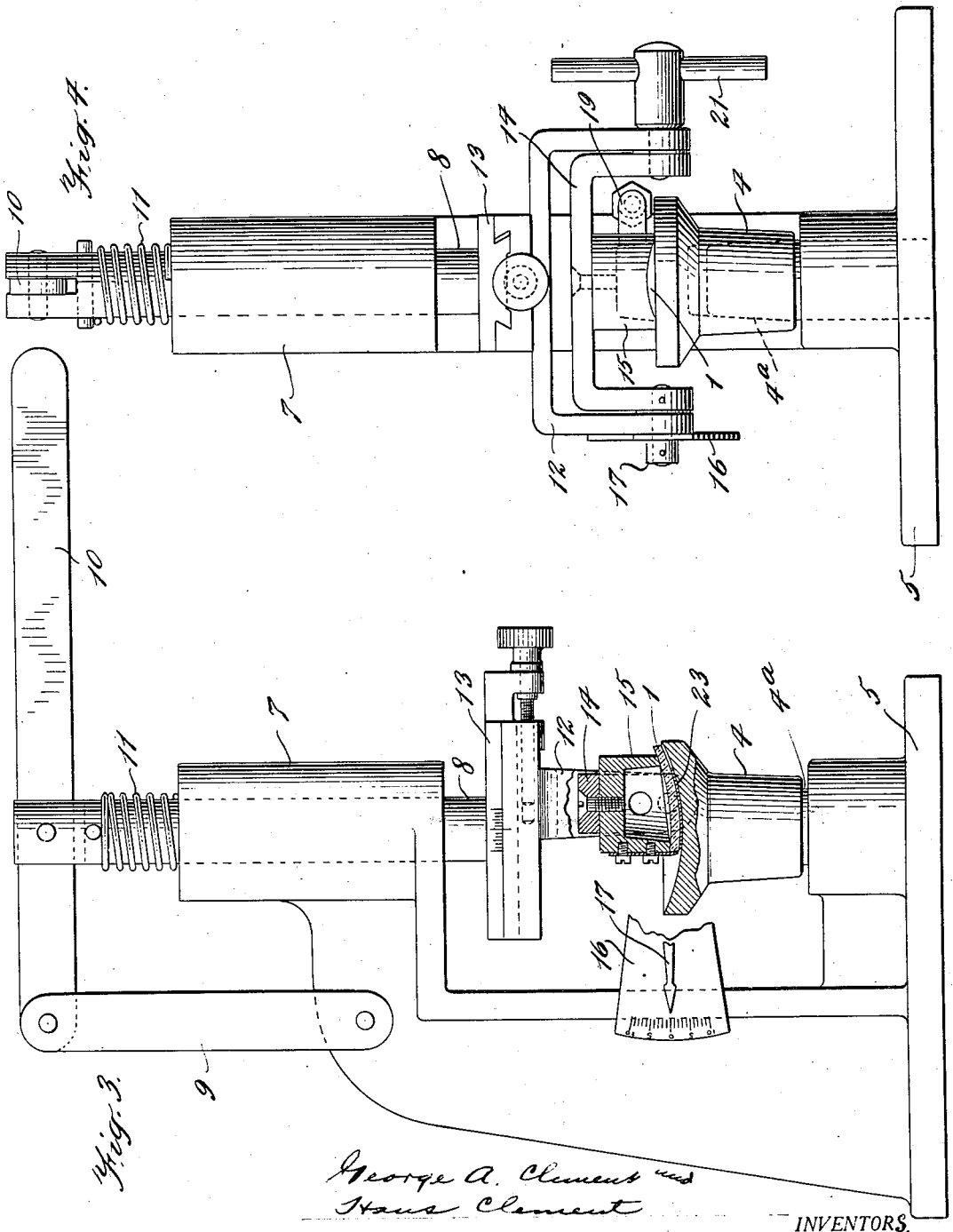

Sept. 11, 1923.
G. A. CLEMENT ET AL
METHOD OF GRINDING ONE-PIECE BIFOCAL LENSES
Filed May 20, 1921  3 Sheets-Sheet 3
1,467,308
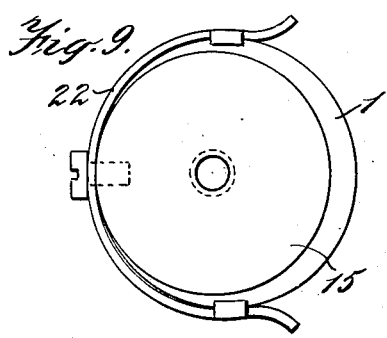
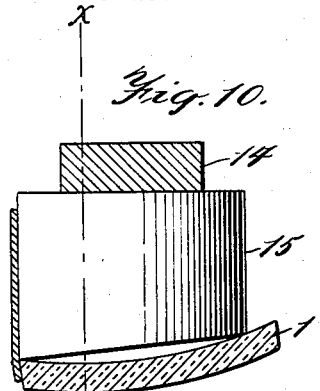
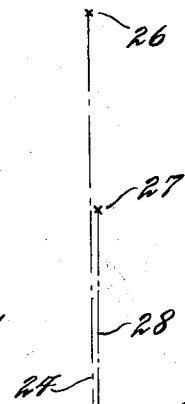
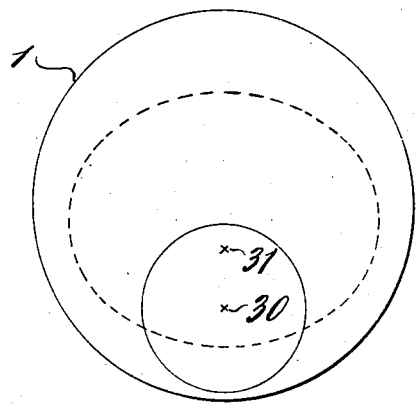
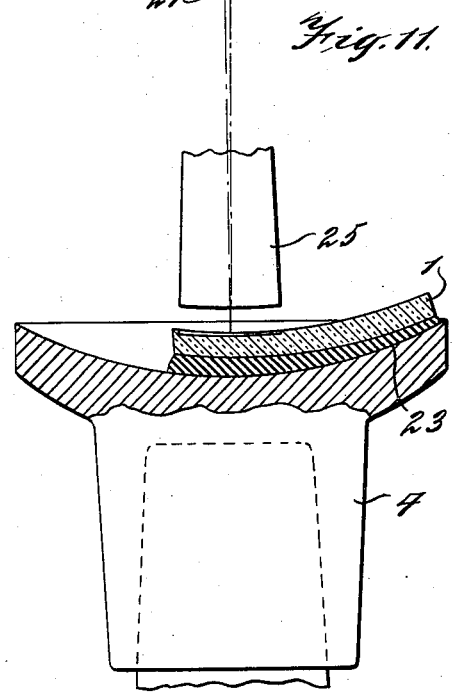
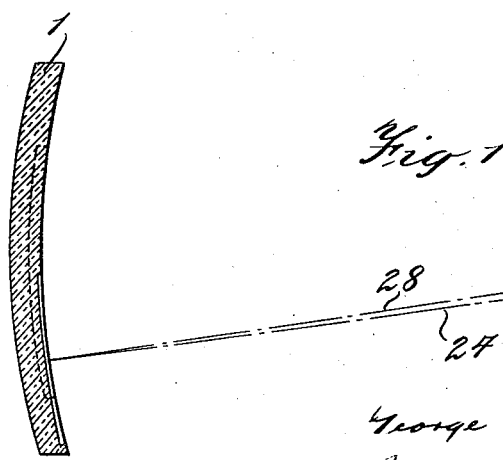
INVENTORS
BY
ATTORNEYS.

Patented Sept. 11, 1923.

1,467,308

UNITED STATES PATENT OFFICE.

GEORGE A. CLEMENT AND HANS CLEMENT, OF MOUNT VERNON, NEW YORK, ASSIGNORS TO GENERAL OPTICAL COMPANY, A CORPORATION OF NEW YORK.

METHOD OF GRINDING ONE-PIECE BIFOCAL LENSES.

Application filed May 20, 1921. Serial No. 471,060.

*To all whom it may concern:*

Be it known that we, GEORGE A. CLEMENT and HANS CLEMENT, citizens of the United States, residing at Mount Vernon, in the county of Westchester and State of New York, have invented certain new and useful Improvements in Methods of Grinding One-Piece Bifocal Lenses, of which the following is a full, clear, and exact description.

Our invention relates to the method of making one-piece bifocal lenses, that is, bifocal lenses consisting of a single homogeneous piece of glass having two different spherical curvatures on one side and a single continuous curvature on its other side, thereby forming a major or distant vision lens portion and a minor or near vision lens portion.

Our method may be employed in grinding either concentric or eccentric bifocal surfaces on one face of a piece of glass. Because of its advantage in producing eccentric bifocal surfaces, our description will be particularly directed to the application of our method to the eccentric surfaces, but it is to be understood that our invention has the more universal application.

The near vision or reading field of bifocal lenses is usually of circular outline and is more or less surrounded by the major or distance portion of the lens. This reading field may be elevated or it may be depressed with respect to the distance field portion, in either of which cases there is a shoulder at the junction of the two fields, or it may merge into the major field without a shoulder, there being only a line of demarcation between the two fields where the two spherical surfaces meet. In order that the two may merge without a shoulder, it is necessary that the radii of the two spheres passing through the geometrical center of the circular reading portion should coincide, and in such a case the surfaces are said to be concentric. If the two radii do not coincide then the surfaces are said to be eccentric, one being tilted with respect to the other and the two surfaces being joined by a shoulder of varying height.

It is desirable to have the optical axes of the two lens portions coincide as nearly as possible with the line of vision through the two fields as the lenses are used, in order to reduce prismatic aberration to a minimum. While the optical axis through the reading field is usually raised somewhat above the geometric center of the field in the finished lens by the disposition of the back surface on the lens, in some prescriptions the optical center is not raised enough to bring it into the line of vision. This is due to the fact that the segment or reading field must be of a certain minimum diameter, and the finished lens is usually cut out so as to include only half or a little more of the height of the segment. The optical center of the segment is therefore in certain prescriptions too near the bottom edge of the lens.

It has heretofore been proposed to tilt the segment so as to increase the prism base on one side or the other of the geometric center, and thereby decenter the lens portion toward that side, and our method may be employed in the making of such eccentric lenses in which the minor lens is decentered upward, although manifestly any type of eccentric bifocal lens can be produced by our method, as well as concentric bifocal lenses.

Our method is in some respects chiefly applicable to the production of periscopic or meniscus one-piece bifocals where the two spherical curvatures are ground on the inner or concave side. One of the most important objects of our invention is to cheapen the cost of production of such lenses. Another object is to provide for an accurate determination of the degree of tilting of the lens that is necessary in order that the desired eccentric relation of the two bifocal lens surfaces may be obtained with precision. Our invention has still other objects as will appear from the following description.

In accordance with our method we take a glass blank of meniscus form and finish the entire inner face to the curvature of the major or distance lens portion. We then reblock the partially finished blank in the proper relation to grind the minor or reading lens portion within the surface of the finished major lens portion, and in so doing we utilize that finished surface as a gage or guide from which to determine the desired relationship to the axis of the block. We can accurately determine a desired radius of that surface and block up the glass with that radius in the exact relationship desired to the axis of the block, which is the axis of generation of the minor surface. In this way a higher degree of accuracy can be obtained than when blocking up with respect to an irregular surface, such as the molded surfaces on the glass blanks are.

An apparent advantage of our method is the fact that it enables us to grind and polish a plurality of blanks at one time to form the major lens portion, and since the reading field or minor portion is subsequently formed in each blank individually, we can make that field of small enough diameter to be entirely included within or surrounded by the major portion, thereby bringing the center of the reading field within its surface when the lens is cut.

The apparatus illustrated in the accompanying drawings is adapted and designed for carrying out our method, and we will now describe that apparatus and its function in performing our method.

Fig. 1 is a detail in elevation of a block and grinding tool, illustrating the method of blocking and grinding a plurality of blanks at one time to form the major lens surfaces thereon;

Fig. 2 is a plan of the block with the plurality of blanks mounted thereon;

Fig. 3 is a detail in side elevation with parts in section, of the blocking mechanism for reblocking the partially finished blanks preparatory to forming the minor lens surface;

Fig. 4 is a front elevation of the same;

Fig. 5 is a view similar to Figure 3 of a portion of the mechanism shown therein and with the lens blank tilted to an indicated degree preparatory to grinding the minor lens surface in a tilted or eccentric relation to the major surface;

Fig. 6 is a detail in side elevation of the annular gage and suction device for holding the blank;

Fig. 7 is a plan of the same;

Figs. 8 and 9 are corresponding views of the gage with a modified form of blank holding means;

Fig. 10 is a detail similar to Figure 6 with the blank in section and the determined radial line of the finished surface indicated;

Fig. 11 is a sectional detail of the blocked lens and the block after the minor surface is ground, indicating the manner of grinding that surface;

Fig. 12 is a face view of the blank with the bifocal surface finished; and

Fig. 13 is a section of the same.

The treatment of the rough blanks in multiple to reduce their inner or minus faces to the curvature desired for the major lens portion may be effected as indicated in Figures 1 and 2, a plurality of blanks 1, shown as eight in number, being pitched to a block 2 of sufficient size, and then surfaced with a tool 3 of the proper curvature in the well known way. When this operation is completed the blanks 1 are removed from the block 2 and pitched to a block 4 on a taper stud 4ª in the proper relation to the axis of the block by means of the reblocking mechanism illustrated in Figures 3 to 9, and which will now be described.

The frame of the reblocking device has a base 5 from which rises a standard 6 terminating at its upper end in an overhanging bearing 7 for the vertically reciprocating spindle 8, which, with its auxiliary parts, constitutes a preliminary holder to hold the semi-finished blanks as they are being reblocked. This spindle is manipulated through links 9 and 10 and is normally held elevated by a coil spring 11. Carried by the lower end of the spindle 8 is what we term the stationary U-shaped member 12, although this member is bodily adjustable transversely of the axis of the spindle 8 through a slide mechanism 13 for a purpose which will be hereinafter described. Pivoted internally to the U-shaped member 12 on a horizontal axis is what we term the pivoted U-shaped member 14 which has secured to its under side the blocking ring or gage 15. The stationary U-shaped member carries an index plate 16 provided with a suitable scale, co-operative with which is a pointer or indicator 17 carried by one of the pivots of the U-shaped member 14. The glass blank 1 is secured to the bottom face of the annular gage 15 against a stop 18 by means of suction, in the form shown. The hollow interior of the gage 15 is connected through a coupling 19 to an air hose 20 leading to a suitable exhausting device. By this means the pressure within the gage 15 is reduced sufficiently to hold the blank 1 firmly in place, as shown in the drawings.

The spindle 8 is disposed in axial alignment with the block 4, and by operating the slide 13 the blank 1 can be adjusted so that when it is secured to the block 4 the segment or minor surface will come just the desired distance from the edge of the blank, when the block 4 is transferred to the grinding machine for forming the segment in the finished surface of the blank. The adjustment of the slide 13 will therefore depend both upon the size of the segment and its distance from the edge of the blank. In every case the adjustment will be such that the radius of the finished surface on the blank 1 which intersects the geometrical center of the area which is to constitute the segment, coincides with the axis of the block 4 and spindle 8 when the indicator 17 is at zero. This radius line is indicated in Fig. 10 by $x$—$x$, and it is evident that the relation of this radius line to the axial line of the spindle 8 and block 4 depends not only on the position of the slide 13 but also on the angular disposition of the gage 15 on its pivots. As a matter of fact the point of intersection of the axial line of the spindle and block with the upper surface of the blank will always be the geometrical center of the segment and the position of this center with respect to the blank varies with the size of the segment and its distance from the edge of the blank. The slide will therefore be set according to the size and location of the segment, and the gage will then be set so that with the line $x$—$x$ coinciding with the axial line, the pointer 17 is at zero. It will be understood that the angular disposition of the gage to effect this result will depend both on the radius of curvature of the lens surface and on the angle of inclination of the lower face of the gage. For instance if it be desired to increase the diameter of the segment, then the slide 13 must be moved one half the difference between the two diameters in order to maintain the distance of the segment from the edge of the blank. In doing this the angle of inclination of the lower face of the gage 15 will necessarily change, since manifestly this angle becomes greater as the gage is moved to the right as viewed in Figure 5. Also the inclination will be greater for a lens of shorter than for a lens of longer radius. For every condition, therefore, the yoke or U-shape member 14 must be set relative to the pointer 17 so that the line $x$—$x$ coincides with the axial line when the pointer is at zero.

Practically the device will be operated continuously for a period upon lens blanks all finished on the minus side to a given base curve and intended for finishing into bifocal surfaces with the segment of a constant diameter and location relative to the edge of the blanks. The yoke 14 will then be set to meet this condition so that with the given base curve, the angle of the bottom face of the gage 15, and the adjustment of the slide 13 to effect the proper disposition of the segment of the prospective size from the edge of the blank, the line $x$—$x$ will coincide with the axial line when the pointer 17 is at zero.

This radial line $x$—$x$ is therefore the one from which the degree of tilt of the blank is measured if the segment is to be prismatic, that is, if it is to be ground eccentrically. The angular adjustment of the gage 15 upon its pivots is effected by means of a hand wheel 21 or the like.

In lieu of the vacuum type of blocking ring, the blocking ring may be provided with a spring clip 22, as shown in Figs. 8 and 9, and for most purposes it will be found that this alternative construction for holding the blank will be satisfactory.

Ordinarily the hand wheel 21 will be so initially adjusted that the radius line $x$—$x$ coincides with the axis of the block 4 and spindle 8; in other words so that the pointer 17 is at zero. While lever 10 and spindle 8 are in elevated position the blank 1 is applied to the under side of the gage or blocking ring 15, and a layer of hot pitch 23 applied to the upper surface of the block 4. If it is desired to grind the segment concentrically with respect to the major surface, the pointer 17 is left at zero and the lever 10 is depressed and the blank is pressed into the pitch 23 and held there until the pitch sufficiently hardens to hold the blank. Then the blank is released from the blocking ring, and the spindle and the parts carried thereby are allowed to rise.

If, on the other hand, it is desired to tilt the blank so as to grind the segment eccentrically, the hand wheel 21 is rotated until the pointer 17 indicates the desired degree of tilting, as is indicated in Fig. 5, for instance, and the spindle 8 is depressed with the blank in that tilted position, and the blank is thus secured to the block. In Fig. 11 we have indicated diagrammatically the subsequent grinding operation to form the segment, and the blank is shown as tilted in this figure to increase the prism base of the segment upward, or in other words to decenter the reading lens upward. The line 24 is the axial line of the block 4 and the grinding tool 25, and since the grinding of the segment is effected by the relative rotation of the tool and blank upon this axis, line 24 is the axis of generation of the segment. The center of generation of the segment is the point 26, while the center of generation of the major surface is the point 27. The line 28, therefore, corresponds to the line $x$—$x$ in Fig. 10.

In Fig. 12 is shown the bifocal face of the blank after the segment has been ground. The back or convex face of the blank is then ground according to prescription, and the finished lens is cut out as indicated by the dotted line. In the sectional view of this blank shown in Fig. 13, in which the finished lens is indicated by dotted lines, it is assumed that the center of the back face is the point 29. As is well understood the optical axis of the major lens portion is along the line including the points 27 and 29, while the optical axis of the minor lens portion is along the line including the points 26 and 29. The tilting of the lens, therefore, serves to raise the optical center of the segment.

If the lens were not tilted and the spherical center 26 of the segment were on line 28, with a plano lens and disregarding the thickness of the lens, the optical center of the segment would be said to coincide with its geometrical center 30. By the tilting of the lens it will be observed that the optical center is raised to substantially the point 31.

It will be obvious that our method may be variously carried out and is independent of the particular apparatus illustrated in the drawings and above described.

We claim:

1. The method of grinding one-piece bifocal lenses consisting in grinding a concave spherical surface over the entire face of one side of a piece of glass, then applying the piece of glass to a preliminary holder with the axis of the holder intersecting the geometric center of the proposed segment, then bringing the holder in opposition to a pitch covered block in axial alignment therewith and with the unground surface of the piece of glass embedded in the pitch, then releasing the glass from the holder and allowing the pitch to harden, and then grinding a second spherical surface of longer radius in said first surface about the axis of the block as the axis of generation.

2. The method of grinding one-piece bifocal lenses consisting in grinding a concave spherical surface over the entire face of one side of a piece of glass, then applying the piece of glass to a preliminary holder with the axis of the holder intersecting the geometric center of the proposed segment, then adjusting the glass upon an axis normal to the axis of the holder to bring the radial line of the said surface intersecting the said geometric center in a desired angular relation to the axis of the holder, then bringing the holder in opposition to a pitch covered block in axial alignment therewith and with the unground surface of the piece of glass embedded in the pitch, then releasing the glass from the holder and allowing the pitch to harden, and then grinding a second spherical surface of longer radius in said first surface about the axis of the block as the axis of generation.

3. The method of blocking semi-finished lenses to grind a prismatic reading segment therein consisting in applying such a lens to a preliminary holder with the axis of the holder intersecting the geometric center of the proposed segment, then tilting the glass upon an axis normal to the axis of the holder to effect a desired angular relation between the said axis and the radial line intersecting the said geometric center, then bringing the holder in opposition to a pitch covered block in axial alignment therewith and with the unground surface of the lens embedded in the pitch, then releasing the lens from the holder, and then allowing the pitch to harden.

In witness whereof, we hereunto subscribe our signatures.

GEORGE A. CLEMENT.
HANS CLEMENT.